US012599959B2

(12) United States Patent
Nie

(10) Patent No.: US 12,599,959 B2
(45) Date of Patent: Apr. 14, 2026

(54) CASTING PROCESS OF CENTRAL ROTARY JOINTS

(71) Applicant: China Railway Sunward Engineering Equipment Co., Ltd., Guangzhou (CN)

(72) Inventor: Xiong Nie, Guangzhou (CN)

(73) Assignee: China Railway Sunward Engineering Equipment Co., Ltd., Guangzhou (CN)

( * ) Notice: Subject to any disclaimer, the term of this patent is extended or adjusted under 35 U.S.C. 154(b) by 14 days.

(21) Appl. No.: 18/773,615

(22) Filed: Jul. 16, 2024

(65) Prior Publication Data

US 2024/0367223 A1 Nov. 7, 2024

Related U.S. Application Data

(63) Continuation of application No. PCT/CN2023/101341, filed on Jun. 20, 2023.

(30) Foreign Application Priority Data

Dec. 8, 2022 (CN) .......................... 202211569478.7

(51) Int. Cl.
| | |
|---|---|
| *B22D 15/04* | (2006.01) |
| *B22C 9/02* | (2006.01) |
| *B22D 15/02* | (2006.01) |
| *B33Y 50/00* | (2015.01) |
| *B33Y 80/00* | (2015.01) |

(52) U.S. Cl.
CPC ................ B22D 15/02 (2013.01); B22C 9/02 (2013.01); B22D 15/04 (2013.01); B33Y 50/00 (2014.12); B33Y 80/00 (2014.12)

(58) Field of Classification Search
CPC ............ B22D 15/02; B22D 15/04; B22C 9/02
See application file for complete search history.

(56) References Cited

U.S. PATENT DOCUMENTS

| | | | | |
|---|---|---|---|---|
| 4,858,673 A | * | 8/1989 | Campana | ................ C10L 11/04 |
| | | | | 164/359 |
| 2014/0060768 A1 | * | 3/2014 | Hasenbusch | .............. B22C 9/02 |
| | | | | 164/352 |
| 2015/0173209 A1 | * | 6/2015 | Dhavaleswarapu | . B23K 20/023 |
| | | | | 228/46 |

FOREIGN PATENT DOCUMENTS

| | | | | | |
|---|---|---|---|---|---|
| CN | 109434029 A | * | 3/2019 | .............. | B22C 9/12 |
| CN | 114632913 A | * | 6/2022 | ............. | B22C 15/28 |

* cited by examiner

*Primary Examiner* — Keith Walker
*Assistant Examiner* — Steven S Ha

(57) ABSTRACT

A casting process of a central rotary joint includes the steps of obtaining an upper casting mold, a lower casting mold, and a sand core through 3-dimensional printing, inserting the chill into the sand core, placing the sand core with the chill in the lower mold, inverting the upper mold onto the lower mold to form a assembled mold and define a casting cavity and a vertical pouring channel connected to the casting cavity between the upper and lower molds, injecting liquid iron into the casting cavity through the vertical pouring channel, unmolding after the liquid iron is condensed to obtain the central rotary joint. Through the vertical pouring channel, the chill and related processes, the sequential solidification of the liquid iron is achieved, effectively avoiding deformation and shrinkage porosity caused by the shrinkage of the liquid iron and graphite expansion during the solidification process.

9 Claims, 2 Drawing Sheets

CASTING PROCESS OF CENTRAL ROTARY JOINTS

CROSS REFERENCE TO RELATED APPLICATION

This application claims priority to Chinese Patent Application No. 202211569478.7, filed Dec. 8, 2022, which is herein incorporated by reference in its entirety.

TECHNICAL FIELD

The disclosure relates to the field of casting process, and particularly to a casting process of a central rotary joint.

BACKGROUND

The casting of the central rotary joint housing is one of the core hydraulic components of a mobile machinery, which is an important connector for the hydraulic system, pneumatic pipelines, and circuit parts of relatively fixed and rotating components. The current hydraulic central rotary joint housing requires a high-pressure bearing capacity of 40 Mega Pascal (MPa), which requires higher internal tissue density and does not allow any casting defects such as shrinkage cavities, shrinkage porosity, slag inclusion, and gas pores.

In the traditional casting process of the central rotary joint, the stability of product quality is relatively low, the rejection rate is high, and it is difficult to ensure the surface quality. The structural integrity of multi-way valve castings cannot meet the requirements, leading to a low casting quality and qualification rate.

Therefore, how to provide a casting process for the central rotary joint that can overcome the aforementioned technical issues and significantly improve the qualification rate of the cast products compared to the related art has become a technical challenge that needs to be urgently addressed by those skilled in the art.

SUMMARY

In order to overcome the problems above, the present disclosure provides a casting process of a central rotary joint that can overcome the technical problems mentioned above and significantly improve the qualification rate of products compared with the central rotary joint casting processes in the related art.

Technical solutions of the present disclosure are as follows.

The present disclosure provides a casting process of a central rotary joint, including:

obtaining an upper mold, a lower mold and a sand core through 3-dimensional (3D) printing; inserting a chill into the sand core; placing the sand core with the chill into the lower mold;

inverting the upper mold onto the lower mold to form an assembled mold and to define a casting cavity and a vertical pouring channel connected to the casting cavity between the upper mold and the lower mold; and pouring liquid iron into the vertical pouring channel and unmolding after the liquid iron is condensed to obtain the central rotary joint.

Furthermore, in an embodiment, the obtaining an upper mold, a lower mold, and a sand core through 3D printing includes:

designing 3D diagrams of the upper and lower molds which are consistent with a shape of the central rotary joint;

designing a 3D diagram of the sand core which is consistent with an internal flow channel of the central rotary joint;

exporting the 3D diagrams of the upper and lower molds into a stereolithography (STL) format, importing the 3D diagrams of the upper and lower molds into a 3D printing device to make initial upper and lower molds; taking out the initial upper and lower molds after molding, correcting the initial upper and lower molds to obtain corrected upper and lower molds, baking the corrected upper and lower molds to obtain the upper mold and the lower mold; and exporting the 3D diagram of the sand core into the STL format, importing the 3D diagram of the sand core into a 3D printing device to make an initial sand core, taking out the initial sand core after molding, correcting the initial sand core to obtain a corrected sand core, baking the corrected sand core to obtain the sand core.

Furthermore, in an embodiment, the casting process of the central rotary joint also includes: obtaining the chill according to a composed chill drawing through computer numerical control (CNC) turning.

Furthermore, in an embodiment, the casting process of the central rotary joint also includes: placing an insulation riser (i.e., dedicated riser) into an upper sand mold (i.e., upper mold), paying attention to sealing of an exhaust channel and the vertical pouring channel; completing forming the assembled mold (i.e., completing molding assembling).

Furthermore, in an embodiment, the step of the inserting a chill into the sand core specifically includes inserting the chill into a middle part and a bottom part of the sand core and then placing the sand core into the lower mold.

Furthermore, in an embodiment, the upper sand mold is provided with a dedicated riser; the dedicated riser is located at a top of the casting cavity and defines the exhaust channel connected to atmosphere.

Furthermore, in an embodiment, the vertical pouring channel includes a direct gating, an upper inner gating, and a lower inner gating which are sequentially connected with each other; the upper inner gating and the lower inner gating are all inclined upwards by 4° to 6°, and the upper and lower inner gatings are connected to the casting cavity.

Furthermore, in an embodiment, the upper and lower inner gatings respectively correspond to two oil ports; and a bottom surface of the direct gating is lower than a bottom of the upper inner gating.

Furthermore, in an embodiment, a pouring temperature of the liquid iron is 1385° C. to 1415° C., with a holding time is 4 to 6 hours. Moreover, the liquid iron is WIEQT500-7 ductile iron liquid.

The casting process of the central rotary joint provided by the present disclosure, including: obtaining the upper mold, the lower mold, and the sand core through the 3D printing; inserting the chill into the sand core; placing the sand core with the chill into the lower mold; inverting the upper mold onto the lower mold to form the assembled mold and to define the casting cavity and the vertical pouring channel connected to the casting cavity between the upper mold and the lower mold; pouring the liquid iron into the casting cavity through a vertical pouring channel and unmolding after the liquid iron is condensed to obtain the central rotary joint. The technical solutions provided by the present disclosure involves an organic interaction between the above technical means and steps. Through the vertical pouring channel, the chill and related processes, sequential solidification is achieved, effectively avoiding deformation and shrinkage porosity caused by shrinkage of the liquid iron and the graphite expansion during the solidification process. Compared with the current central rotary joint casting process, the qualification rate of the product is significantly improved.

BRIEF DESCRIPTION OF DRAWINGS

In order to provide a clearer explanation of embodiments or technical solutions in the present disclosure or prior art, a brief introduction will be made to drawings required in the embodiments or prior art description. Apparently, the drawings in following description are only some of the embodiments of the present disclosure. For those skilled in the art, other drawings can be obtained based on these drawings without creative labor.

FIG. 2 illustrates a schematic diagram of the assembled mold after molding according to the embodiment of the present disclosure.

FIG. 3 illustrates a top view of the assembled mold after molding according to the embodiment of the present disclosure.

Figure 1:
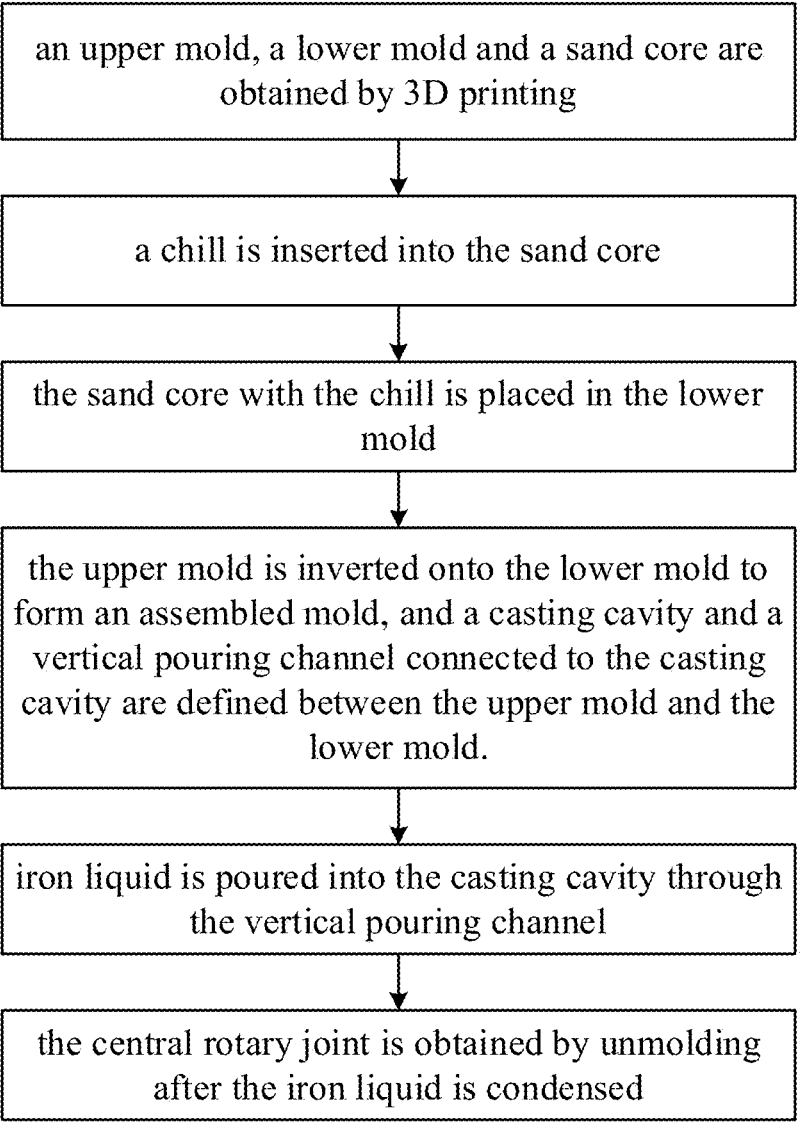
FIG. 1 illustrates an operating flow chart of a casting process of a central rotary joint according to an embodiment of the present disclosure.

Description of reference numerals: 1 vertical pouring channel; 2 assembled mold; 2A upper mold; 2B lower mold; 3 chill; 4 casting cavity; 5 sand core; 6 dedicated riser; 7 exhaust channel; 101 direct gating; 102 lower inner gating; 103 upper inner gating.

DETAILED DESCRIPTION OF EMBODIMENTS

In order to enable those skilled in the art to better understand technical solutions in the present disclosure, the following will provide a clear and complete description of the technical solutions in the embodiments of the present disclosure in conjunction with the drawings. Apparently, the described embodiments are only a part of the embodiments in the present disclosure, not all of them. Based on the embodiments in the present disclosure, all other embodiments obtained by those skilled in the art without creative labor fall within the scope of protection of the present disclosure.

It should be noted that when a component is referred to as "fixed on" or "set on" another component, it can be directly or indirectly set on another component. When a component is referred to as "connected to" another component, it can be directly connected to the another component or indirectly connected to the another component.

It should be understood that the orientation or position relationship indicated by the terms "longitudinal", "transverse", "up", "down", "front", "back", "vertical", "horizontal", "top", "bottom", "inside", "outside", etc. is based on the orientation or position relationship illustrated in the drawings, which is only for the convenience of describing the embodiments of the present disclosure and simplifying the description, and does not indicate or imply that the device or component referred to must have a specific orientation, or be constructed and operated in a specific orientation. Therefore, it cannot be understood as a limitation on the embodiments of the present disclosure.

In addition, the terms "first" and "second" are only used to describe the purpose and cannot be understood as indicating or implying relative importance or implying the quantity of technical features indicated. Therefore, the features limited to "first" and "second" can explicitly or implicitly include one or more of these features. In the description of the present disclosure, "multiple" or "several" means two or more, unless otherwise specified.

Note that the structures, proportions, sizes, etc. depicted in the drawings of this specification are only intended to complement the content disclosed in the specification, for those skilled in the art to understand and read, and are not intended to limit the limitations that can be implemented in the present disclosure. Therefore, they do not have technical substantive significance. Any modifications to the structure, changes in the proportion relationship, or adjustments in size should still fall within the scope of the technical content disclosed in the present disclosure, without affecting the effectiveness and goals that can be achieved.

Figures 2, 3:
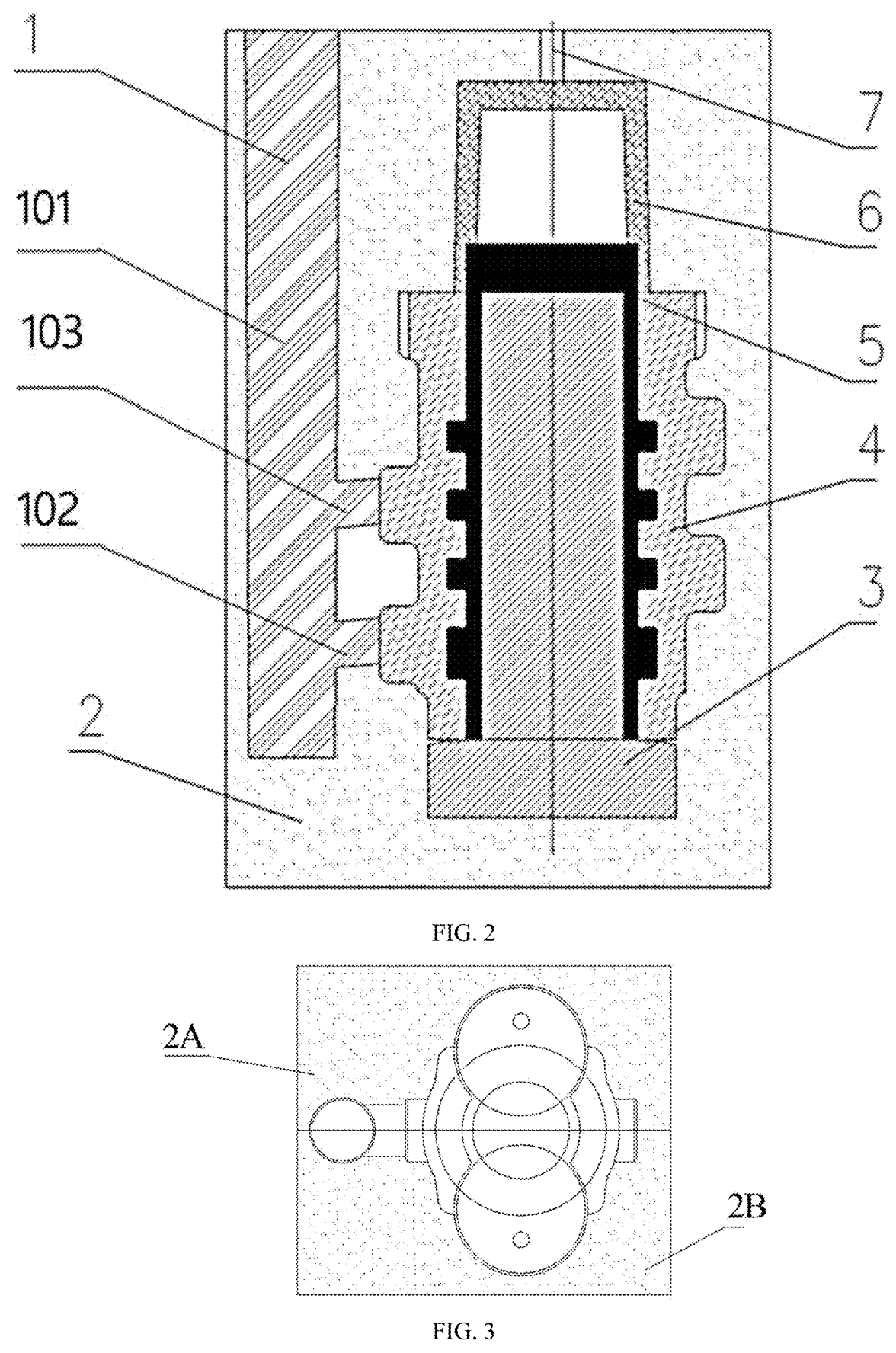

As illustrated in FIGS. 1 to 3, a casting process of a central rotary joint according to an embodiment of the present disclosure, includes the following steps: an upper mold, a lower mold and a sand core 5 are obtained by 3D printing. A chill 3 is inserted into the sand core 5 and the sand core 5 with the chill 3 is placed in the lower mold.

The upper mold is inverted onto the lower mold to form an assembled mold 2, and a casting cavity 4 and a vertical pouring channel 1 connected to the casting cavity 4 are defined between the upper mold and the lower mold. Iron liquid is poured into the casting cavity 4 through the vertical pouring channel 1, and the central rotary joint is obtained by unmolding after the iron liquid is condensed.

The present disclosure provides a technical solution as follows: the casting process of the central rotary joint includes the following steps: the upper mold, the lower mold and the sand core 5 are obtained by 3D printing; the chill 3 is inserted into the sand core 5, and the sand core 5 with the chill 3 is placed in the lower mold; the upper mold is inverted onto the lower mold to form the assembled mold 2, a casting cavity 4 and a vertical pouring channel 1 connected to the casting cavity 4 are defined between the upper mold and the lower mold; iron liquid is poured into the casting cavity 4 through the vertical pouring channel 1, and the central rotary joint is obtained by unmolding after the iron liquid is condensed. The technical solution provided by the present disclosure involves an organic interaction between the above technical means and steps. Through the vertical pouring channel 1 and the chill 3 along with other related technical means and process links, the sequential solidification of liquid iron is achieved, effectively avoiding deformation and shrinkage porosity caused by the shrinkage of the liquid iron and the graphite expansion during the solidification process. Compared with the central rotary joint casting process in the related art, the qualification rate of the product is significantly improved.

Specifically, in the embodiment of the present disclosure, the step of obtaining the upper mold, the lower mold and the sand core 5 by the 3D printing, further includes following steps: 3D diagrams of the upper mold 2A and the lower mold 2B which are consistent with a shape of the central rotary joint are designed. A 3D diagram of the sand core 5 which is consistent with an internal flow channel of the central rotary joint is designed. The 3D diagrams of the upper mold 2A and the lower mold 2B are exported into a STL format. The 3D diagrams of the upper mold 2A and the lower mold 2B are imported into a 3D printing device to make initial upper and lower molds. The initial upper and lower molds are taken out after molding. The initial upper and lower molds are corrected to obtain corrected upper and lower molds. The corrected upper and lower molds are baked, and the upper mold 2A and the lower mold 2B are obtained. The 3D diagram of the sand core 5 is exported into the STL format, the 3D diagram of the sand core 5 is imported into a 3D printing device to make an initial sand core. The initial sand core is taken out after molding. The initial sand core is corrected to obtain a corrected sand core. The corrected sand core is baked to obtain the sand core 5.

Specifically, in an embodiment of the present disclosure, the casting process of the central rotary joint according to the embodiment further includes the step: the chill 3 is obtained through CNC turning according to a composed chill drawing.

Specifically, in an embodiment of the present disclosure, the casting process of the central rotary joint according to the embodiment further includes the step: an dedicated riser 6 (also referred to as insulation riser) is placed into the upper sand mold 2A (also referred to as upper mold 2A), attention is paid to sealing of an exhaust channel 7 and the vertical pouring channel 1, and the assembled mold 2 is completely formed.

Specifically, in an embodiment of the present disclosure, the step of placing the chill 3 into the sand core 5 and placing the sand core 5 with the chill 3 into the lower mold, further includes the step: a middle part and a bottom part of the sand core 5 is inserted with the chill 3 and the sand core 5 with the chill 3 is placed into the lower mold.

Specifically, in an embodiment of the present disclosure, the upper sand mold 2A is provided with the dedicated riser 6. The dedicated riser 6 is located at a top of the casting cavity 4 and defines the exhaust channel 7 connected to atmosphere.

Specifically, in an embodiment of the present disclosure, the vertical pouring channel 1 includes a direct gating 101, an upper inner gating 103, and a lower inner gating 102 which are sequentially connected with each other. The upper inner gating 103 and the lower inner gating 102 are all inclined upwards by 4° to 6°, and the upper inner gating 103 and the lower inner gating 102 are connected to the casting cavity 4.

Specifically, in an embodiment of the present disclosure, the upper inner gating 103 and the lower inner gating 102 correspond to two oil ports respectively. And a bottom surface of the direct gating is lower than a bottom of the upper inner gating.

Specifically, in an embodiment of the present disclosure, a pouring temperature of the liquid iron is 1385° C. to 1415° C. with a holding time 4 to 6 hours. Moreover, the liquid iron is WIEQT500-7 ductile iron liquid.

To be more specific, in the embodiment, adopting 3D printing for molding not only can greatly shorten the development cycle of traditional metal molds, but also can improve the strength and rigidity of molds. This can effectively avoid deformation and shrinkage porosity caused by the shrinkage of the liquid iron and the graphite expansion during the solidification process. Moreover, compared with a resin sand molding, it has advantages of low cost, safety and environmental protection. By utilizing a 3D sand core, the good collapsibility of the sand can be utilized to ensure the accuracy and surface smoothness of the shell flow channel, while making it easy to clean the sand in the internal flow channel of the casting.

It should be noted that there are many situations in the related art that affect the product qualification rate. However, the reasons disclosed in the embodiment of the present disclosure that the deformation and the shrinkage porosity caused by the shrinkage of the liquid iron and the graphite expansion affects product quality are not easy to think of or encounter. Therefore, the discovery behind this technical problem requires a certain degree of creative thinking.

As illustrated in FIG. 3, in the embodiment, the vertical pouring channel 1 includes the sequentially connected direct gating 101, the upper inner gating 103 and the lower inner gating 102 and the insulation riser. The upper inner gating 103, the lower inner gating 102 and the insulation riser are all connected to the casting cavity 4. Through the above structural design, the effect of solidification in sequence can be achieved. Liquid metal flows by the direct gating 101, the lower inner gating 102 and the upper inner gating 103 and flows into the casting cavity 4 through the oil ports 104. The liquid iron flows into the casting cavity 4 smoothly, causing minimal erosion of the sand core 5 and the casting cavity 4, while avoiding turbulence and entrainment of gas and slag.

As illustrated in FIG. 2, in other embodiments, the bottom of the upper inner gating 103 is higher than the bottom surface of the direct gating 101. Through this setting method, the liquid metal can be filled and then flow into the casting cavity 4 through the upper inner gating 103 and the lower inner gating 102 to avoid direct flow of the liquid metal into inner gatings, thereby improving the casting quality.

As illustrated in FIG. 2, in other embodiments, in order to prevent impurities from flowing into the casting cavity 4, the upper inner gating 103 and the lower inner gating 102 are inclined upwards by 5°. A top of the direct gating 101 is provided with a filter screen and a gate cup.

As illustrated in FIG. 2, in other embodiments, the insulation riser and the exhaust channel 7 are located at the top of the casting cavity 4. The liquid metal flows into the casting cavity 4 through the direct gating 101, the lower inner gating 102, and the upper inner gating 103 and the oil ports 104. After the cavity is filled, the liquid shrinkage temperature and volume caused by solidification of the casting are fully compensated through the insulation riser, thereby improving the casting quality.

As illustrated in FIG. 2, in other embodiments, the insulation riser and the exhaust channel 7 are located at the top of the casting cavity 4. The liquid metal flows into the casting cavity 4 through the direct gating 101, the lower inner gating 102, the upper inner gating 103 and the oil ports 104. During the filling process, the gas in the casting cavity 4 flows from a bottom to a top and finally exits the casting cavity 4 through the insulation riser and the exhaust channel 7 until the gas is completely discharged, and the metal liquid fills the hollowed casting cavity 4, thereby improving the casting quality of the casting.

More specifically, the above casting process includes following steps.

In step 1, 3D diagrams of the upper and lower molds which are consistent with a shape of the central rotary joint are designed. A 3D diagram of the sand core 5 which is consistent with the internal flow channel of the central rotary joint is designed.

In step 2, the 3D diagrams of the upper and lower molds are exported into a STL format. The 3D diagrams of the upper and lower molds are imported into a 3D printing device to make initial upper and lower molds. The initial upper and lower molds are taken out after molding. The initial upper and lower molds are corrected to obtain corrected upper and lower molds. The corrected upper and lower molds are baked, and the upper mold 2A and the lower mold 2B are obtained.

In step 3, the 3D diagram of the sand core 5 is exported into the STL format, the 3D diagram of the sand core 5 is imported into a 3D printing device to make an initial sand core. The initial sand core is taken out after molding. The initial sand core is corrected to obtain a corrected sand core. And the corrected sand core is baked, and the sand core 5 is obtained.

In step 4, the composed chill drawing is delivered to a machining workshop, and the chill 3 is obtained after CNC turning.

In step 5, the chill 3 is placed into the sand core 5 to obtain the sand core 5 with the chill 3.

In step 6, the sand core 5 with the chill 3 is placed into the lower mold 2B.

In step 7, the upper mold 2A is inverted according to identifications onto the lower mold 2B with the sand core 5 with the chill 3 placed inside.

In step 8, the insulation riser is inserted into the upper sand mold 2A, attention is paid to sealing of the exhaust channel 7 and vertical pouring channel 1, thereby completing forming the assembled mold 2.

In step 9, a dedicated fixture is tightened to complete the casting of the assembled mold 2.

In step 10, the assembled mold 2 is pushed into a pouring line for pouring, condensing and then obtaining the central rotary joint. Compared with traditional process techniques, the casting process provided in the embodiment of the present disclosure has the following beneficial effects:

1. Utilizing 3D printing to print molds greatly improves efficiency. Traditional mold development requires 20 days. And using 3D printing to print molds costs 3 days, saving 17 days of time.
2. Utilizing 3D printing to print the molds and the sand core 5 brings the obtained molds and flow channels high accuracy and surface quality with roughness average (RA) less than 6.3.
3. Utilizing 3D printing, the casting cavity 4 is hollow, which has the same molding effect as the mold modeling, but has more advantageous than disappearing molds. There is no need to burn foam molds and bring casting defects such as carbon deposition and slag.
4. Adopting the vertical pouring channel plus multifunctional chill plus top riser process achieves sequential solidification, effectively avoiding deformation and porosity caused by shrinkage of the liquid iron and graphite expansion during the solidification process, and increasing the qualification rate by 5% compared to the original shell casting process.
5. Utilizing 3D printing for casting greatly reduces costs. Adopting 3D printing for casting cost 900 yuan while traditional molds cost 30000 yuan.
6. Utilizing 3D printing for casting reduce manual unboxing, flipping, positioning, and closing of boxes. The number of parting seams and polishing is also reduced, greatly reducing labor intensity and saving a manual labor intensity of 63 minutes per piece (MIN/piece).

The above explanation of the disclosed embodiments enables those skilled in the art to implement or use the present disclosure. The various modifications to these embodiments will be apparent to those skilled in the art, and the general principles defined in the present disclosure can be implemented in other embodiments without departing from the spirit or scope of the present disclosure. Therefore, the present disclosure will not be limited to the embodiments illustrated herein, but will conform to the widest range consistent with the principles and novel features disclosed herein.

What is claimed is:

1. A casting process of a central rotary joint, comprising:
   obtaining an upper mold, a lower mold and a sand core through 3-dimensional (3D) printing;
   inserting a chill into the sand core;
   placing the sand core with the chill into the lower mold;
   inverting the upper mold onto the lower mold to form an assembled mold and to define a casting cavity and a vertical pouring channel connected to the casting cavity between the upper mold and the lower mold; and
   pouring liquid iron into the vertical pouring channel and unmolding after the liquid iron is condensed to obtain the central rotary joint;
   wherein the vertical pouring channel comprises a direct gating, an upper inner gating, and a lower inner gating which are sequentially connected with each other; the upper inner gating and the lower inner gating are all inclined upwards by 4° to 6°, and the upper and lower inner gatings are connected to the casting cavity.

2. The casting process of the central rotary joint as claimed in claim 1, wherein the obtaining an upper mold, a lower mold and a sand core through 3D printing comprises:
   designing 3D diagrams of the upper and lower molds which are consistent with a shape of the central rotary joint;
   designing a 3D diagram of the sand core which is consistent with an internal flow channel of the central rotary joint;
   exporting the 3D diagrams of the upper and lower molds into a stereolithography (STL) format, importing the 3D diagrams of the upper and lower molds into a 3D printing device to make initial upper and lower molds; taking out the initial upper and lower molds after molding, correcting the initial upper and lower molds to obtain corrected upper and lower molds, baking the corrected upper and lower molds to obtain the upper mold and the lower mold; and
   exporting the 3D diagram of the sand core into the STL format, importing the 3D diagram of the sand core into a 3D printing device to make an initial sand core, taking out the initial sand core after molding, correcting the initial sand core to obtain corrected sand core, baking the corrected sand core to obtain the sand core.

3. The casting process of the central rotary joint as claimed in claim 2, further comprising:
   obtaining the chill according to a composed chill drawing through computer numerical control (CNC) turning.

4. The casting process of the central rotary joint as claimed in claim 2, wherein the inserting a chill into the sand core, specifically comprises: inserting the chill into a middle part and a bottom part of the sand core and then placing the sand core into the lower mold.

5. The casting process of the central rotary joint as claimed in claim 4, wherein the upper mold is provided with a dedicated riser; the dedicated riser is located at a top of the casting cavity and defines an exhaust channel connected to atmosphere.

6. The casting process of the central rotary joint as claimed in claim 2, wherein a pouring temperature of the liquid iron is 1385° C. to 1415° C., with a holding time 4 to 6 hours.

7. The casting process of the central rotary joint as claimed in claim 1, further comprising:
   placing an insulation riser into the upper mold.

8. The casting process of the central rotary joint as claimed in claim 1, wherein a bottom surface of the direct gating is lower than a bottom of the upper inner gating.

9. A casting process of a central rotary joint, comprising:

obtaining an upper mold, a lower mold and a sand core through 3-dimensional (3D) printing;

inserting a chill into the sand core;

placing the sand core with the chill into the lower mold;

inverting the upper mold onto the lower mold to form an assembled mold and to define a casting cavity and a vertical pouring channel connected to the casting cavity between the upper mold and the lower mold; and pouring liquid iron into the vertical pouring channel and unmolding after the liquid iron is condensed to obtain the central rotary joint;

wherein the obtaining an upper mold, a lower mold and a sand core through 3D printing comprises:

designing 3D diagrams of the upper and lower molds which are consistent with a shape of the central rotary joint;

designing a 3D diagram of the sand core which is consistent with an internal flow channel of the central rotary joint;

exporting the 3D diagrams of the upper and lower molds into a stereolithography (STL) format, importing the 3D diagrams of the upper and lower molds into a 3D printing device to make initial upper and lower molds; taking out the initial upper and lower molds after molding, correcting the initial upper and lower molds to obtain corrected upper and lower molds, baking the corrected upper and lower molds to obtain the upper mold and the lower mold; and exporting the 3D diagram of the sand core into the STL format, importing the 3D diagram of the sand core into a 3D printing device to make an initial sand core, taking out the initial sand core after molding, correcting the initial sand core to obtain corrected sand core, baking the corrected sand core to obtain the sand core;

wherein the inserting a chill into the sand core, specifically comprises: inserting the chill into a middle part and a bottom part of the sand core and then placing the sand core into the lower mold;

wherein the upper mold is provided with a dedicated riser; the dedicated riser is located at a top of the casting cavity and defines an exhaust channel connected to atmosphere; and wherein the vertical pouring channel comprises a direct gating, an upper inner gating, and a lower inner gating which are sequentially connected with each other; the upper inner gating and the lower inner gating are all inclined upwards by 4° to 6°, and the upper and lower inner gatings are connected to the casting cavity.

* * * * *